Oct. 16, 1962   W. A. GANGUET ET AL   3,058,282
COTTON HARVESTER
Filed Nov. 10, 1960   2 Sheets-Sheet 1
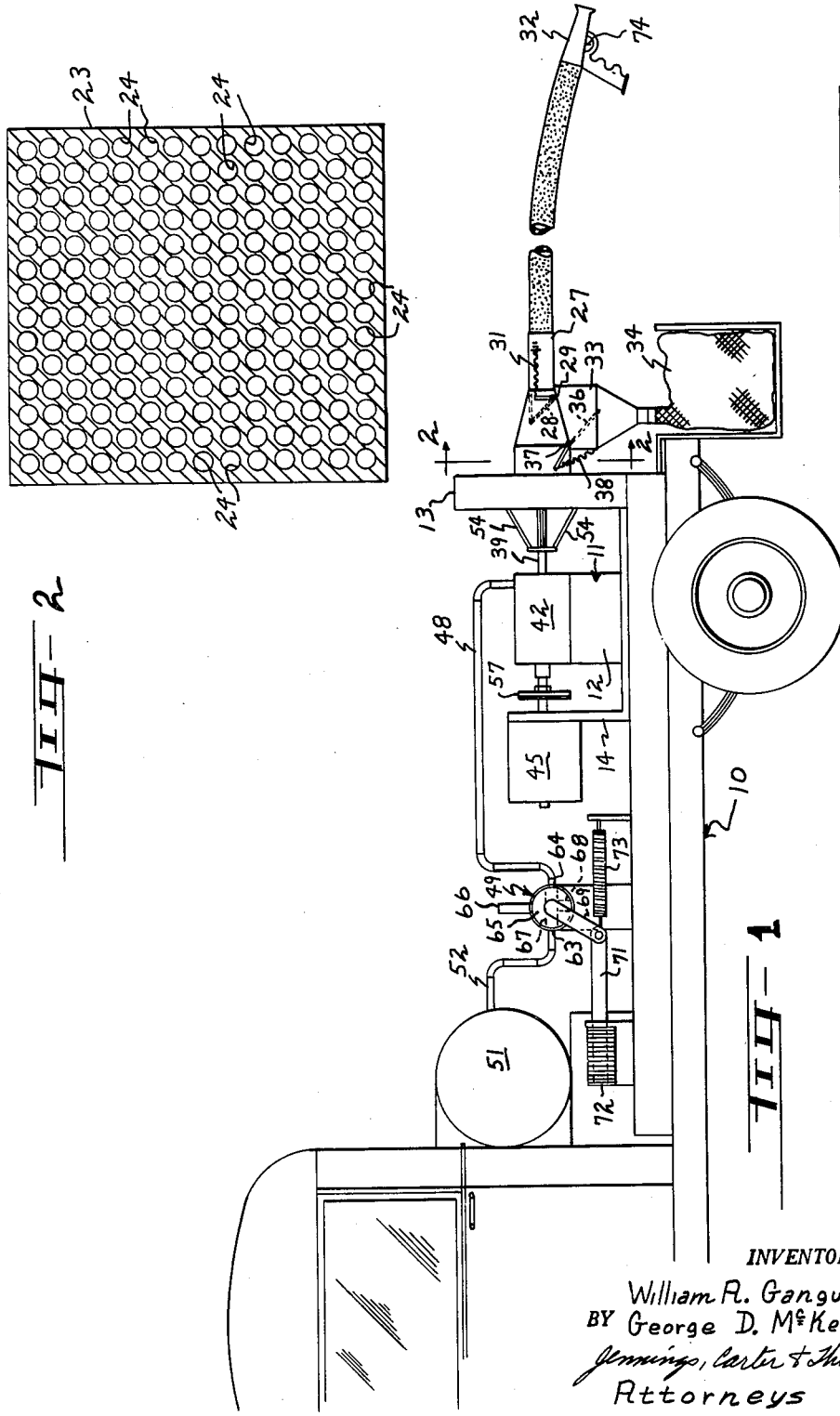
INVENTORS
William A. Ganguet
George D. McKenzie
BY
Jennings, Carter & Thompson
Attorneys INVENTORS
William A. Ganguet
George D. McKenzie
BY Jennings, Carter & Thompson Attorneys United States Patent Office 3,058,282
Patented Oct. 16, 1962

3,058,282
COTTON HARVESTER
William A. Ganguet, Cuba, Ala., and George D.
McKenzie, 115 Magnolia Ave., Evergreen, Ala.
Filed Nov. 10, 1960, Ser. No. 68,548
9 Claims. (Cl. 56—13)

This invention relates to a cotton harvester and more particularly to a pneumatic cotton picking machine.

An object of our invention is to provide a pneumatic cotton harvester of the character designated in which the cotton is picked in an improved manner without gathering trash, leaves and the like along with the cotton.

Another object of our invention is to provide a pneumatic cotton harvester of the character designated in which the cotton is actually cleaned during the picking operation.

Another object of our invention is to provide a pneumatic cotton harvester of the character designated which shall include improved means for maintaining the apparatus in a clean condition at all times whereby the apparatus is trouble-free in operation.

A further object of our invention is to provide a cotton harvester of the character designated in which the moving parts of the apparatus travel a minimum distance whereby smoother operation is obtained and less wear is incurred due to the movement of the parts relative to each other.

A still further object of our invention is to provide a pneumatic cotton harvester of the character designated which shall be simple of construction, economical of manufacture and one which may be operated by unskilled labor.

Apparatus embodying features of our invention is illustrated in the accompanying drawings, forming a part of this application, in which:

FIG. 1 is a side elevational view, partly broken away, showing the cotton harvester mounted on a translatable frame;

FIG. 2 is an enlarged sectional view taken generally along the line 2—2 of FIG. 1;

Figure 3:
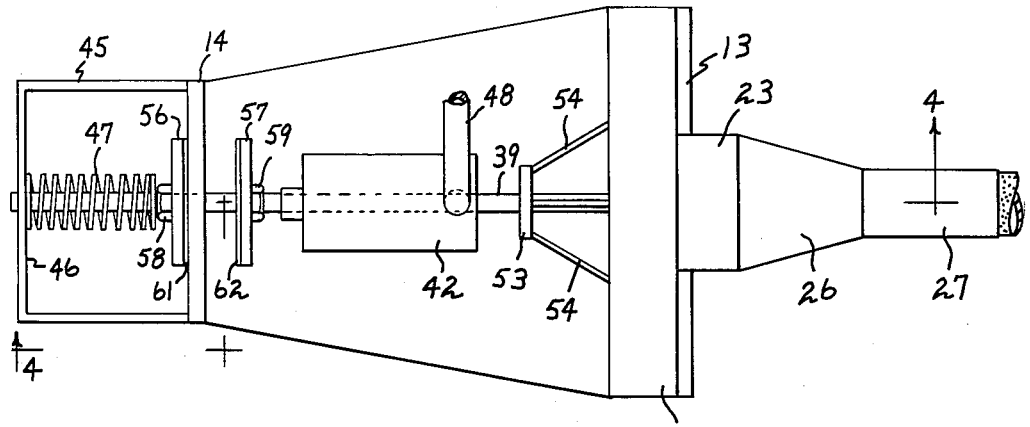
FIG. 3 is an enlarged plan view, partly in section, showing the cotton harvester removed from the translatable frame.
Figure 5:
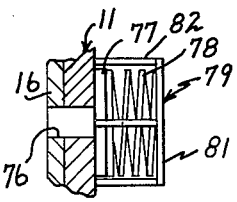
FIG. 5 is an enlarged sectional view showing the check valve construction which permits automatic cleaning of the bellows housing each time the diaphragm is actuated.

Referring now to the drawings for a better understanding of our invention, we show a translatable frame 10, which may be in the form of a truck, tractor or the like. Mounted on the translatable frame 10 is a support frame 11 having a raised central portion 12 and upstanding end portions 13 and 14.

Figure 4:
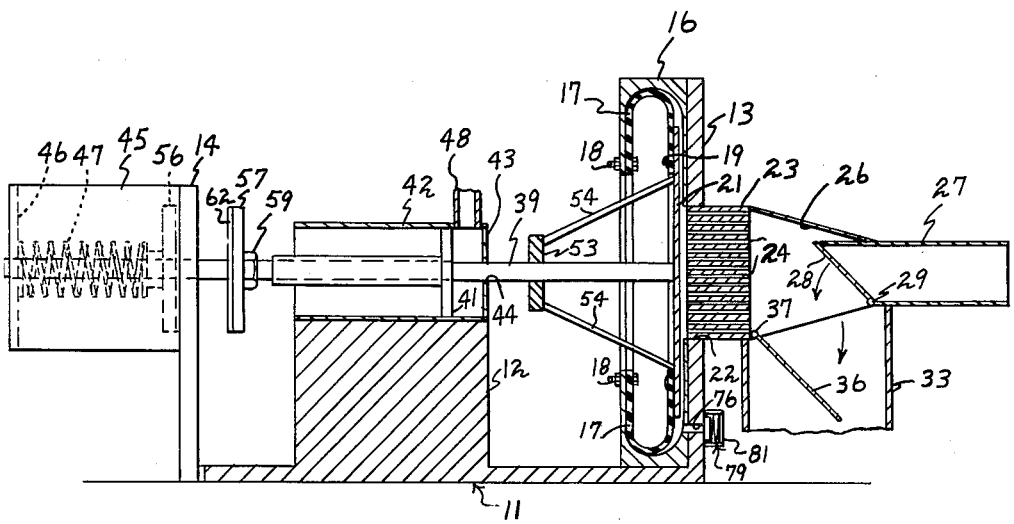
FIG. 4 is a sectional view taken generally along line 4—4 of FIG. 3.

Mounted on the support frame 11 adjacent the end portion 13 is an annular bellows housing 16. Within the bellows housing 16 is an annular diaphragm 17 which is formed of a suitable flexible material, such as rubber or the like. As shown in FIG. 4, the annular diaphragm is generally U-shaped, as viewed in transverse cross section. One edge of the diaphragm 17 is secured by suitable retaining means, such as bolts 18 to the adjacent side of the bellows housing 16, as shown in FIG. 4. The other edge of the diaphragm 17 is secured by suitable retaining means 19 to a plate-like member 21.

The end portion 13 of the support frame 11 is provided with an opening 22 therethrough whereby upon movement of the plate-like member 21 away from and toward the upstanding end portion 13, air is drawn into the bellows housing 16 and exhausted therefrom. Communicating with the opening 22 is a partition member 23 having a plurality of openings 24 therein which are of a size to permit free flow of air through the partition member and prevent the passage of cotton therethrough. Communicating with the side of the partition member 23 opposite the side thereof which communicates with the opening 22 is a cotton receiving chamber 26. Communicating with the side of the cotton receiving chamber 26 opposite the side thereof which is in communication with the partition member 23 is a cotton pickup tube 27. The cotton receiving member 26 is separated from the cotton pickup tube 27 by a check valve 28 which permits flow of air and cotton inwardly of the cotton receiving chamber 26 only. That is, the cotton and air can only flow from the cotton pickup tube 27 into the cotton receiving chamber 26 and cannot flow outwardly of the cotton receiving chamber into the tube 27. The check valve member 28 is mounted on suitable hinges 29 and is urged toward closed position by a suitable tension spring 31. As shown in FIG. 1, a cotton pickup nozzle 32 is mounted at the free end of the cotton pickup tube 27.

Communicating with the cotton receiving chamber 26 intermediate the check valve 28 and the partition member 23 is a cotton discharge passageway 33 which is disposed to discharge the cotton into a suitable receptacle, such as a bag 34, or the like. The cotton discharge passageway 33 is separated from the cotton receiving chamber 26 by a check valve 36 which permits the cotton to flow from the cotton receiving chamber 26 into the cotton discharge passageway 33 but prevents the cotton from flowing from the passageway 33 to the cotton receiving chamber 26. The check valve 36 is mounted on a suitable hinge member 37 and is urged toward closed position by a tension spring 38, as shown in FIG. 1.

Secured to the plate-like member 21 on the side thereof opposite the partition member 23 is an actuating rod 39 which carries a piston 41. As shown in FIG. 4, the piston 41 is mounted for reciprocatory motion in a cylinder 42 having a closed end wall 43 on the side thereof adjacent the plate-like member 21. A suitable opening 44 is provided in the wall 43 for receiving the actuating rod 39 with a sliding fit.

Mounted on the upstanding end portion 14 is a U-shaped housing 45 having a transverse base member 46 which acts as a spring abutment for a compression spring 47 which in turn urges the actuating rod 39 and the piston 41 toward the plate-like member 21, as shown in FIGS. 3 and 4. Fluid under pressure, such as air, is supplied to the cylinder 42 intermediate the piston 41 and the wall 43 by a suitable supply conduit 48 which communicates with one side of a two-way control valve 49. The other side of the two-way valve 49 communicates with a compressor 51 by a conduit 52.

Secured to the actuating rod 39 intermediate the wall 43 of the cylinder 42 and the plate-like member 21 is a disc member 53. The outer portion of the plate-like member 21 is connected to the outer portion of the disc member 53 by suitable reinforcing bars 54 whereby the plate-like member 21 is reinforced. Secured to the actuating rod 39 at opposite sides of the upstanding end portion 14 of the support frame 11 are disc-like stop members 56 and 57 which are locked in selected positions by suitable lock nuts 58 and 59, respectively. The stop members 56 and 57 are provided with resilient faces 61 and 62, respectively, which are disposed to engage opposite sides of the upstanding end portion 14 of the support frame 11, as shown in FIGS. 3 and 4, to thereby limit movement of the actuating rod 39 and the piston 41 relative to the cylinder 42.

As shown in FIG. 1, the valve 49 is provided with an inlet port 63, an outlet port 64 and an exhaust port 66. The inlet port 63 is connected to the conduit 52 which is in communication with the compressor 51 while the outlet port 64 is in communication with the conduit 48 which communicates with the cylinder 42. The valve 49 is also provided with a rotary element 65 having a through passageway 67 therein which connects the inlet conduit 52 to the outlet conduit 48 when the valve 49 is in the position shown in FIG. 1. Communicating with the through passageway 67 is a lateral passageway 68 which is adapted to move into communication with the conduit 48 upon movement of the rotary element 65 of the valve 90° in a counterclockwise direction. In this latter position the through passageway 67 would be in communication with the exhaust port 66 whereby the fluid under pressure in line 48 and cylinder 42 is exhausted to the atmosphere. The rotary element 65 of the valve 49 is actuated by an arm 69 which is connected at one end to the rotary element. The other end of the arm 69 is connected to the armature 71 of an electrical solenoid 72 whereby upon energizing the solenoid the arm 69 is moved in a clockwise direction to position the rotary element 65 of the valve 49 in the position shown in FIG. 1. The arm 69 and the rotary element of the valve 49 are then returned to the exhaust position by a return spring 73. That is, the spring 73 moves the rotary element of the valve whereby the through passageway 67 is in communication with the exhaust port 66 while the lateral passageway 68 is in communication with the conduit 48. The electrical solenoid 72 is actuated by a trigger-like switch element 74 which is carried by the cotton pick-up nozzle 32.

A discharge opening 76 is provided in the side of the bellows housing 16 and the upstanding end portion 13 for the discharge of any dirt, trash or other foreign materials which may accumulate in the bellows housing 16. A check valve 77 is mounted outwardly of the upstanding end portion 13 and is urged into engagement therewith adjacent the opening 76 by a compression spring 78. A suitable housing 79 supports the spring 78, as shown, whereby the check valve 77 is constantly urged toward the opening 76. The housing 79 comprises a base plate 81 which is connected to the support frame 11 by rod-like members 82 whereby free flow of air and foreign material is permitted as the check valve 77 is moved to open position. The check valve 77 is moved toward open position only when the diaphragm 17 and the plate-like member 21 are moving toward the perforated partition member 23 to exhaust air from the bellows housing 16. Accordingly, as the diaphragm 17 is moving in the opposite direction to draw air into the bellows housing, the check valve 77 is closed whereby it does not interfere with the creation of the partial vacuum within the bellows housing.

From the foregoing description, the operation of our improved pneumatic cotton harvester will be readily understood. A suitable receptacle, such as a bag 34 is positioned beneath the cotton discharge passageway 33 in position to receive the cotton discharged therefrom. The cotton pickup nozzle 32 is then positioned adjacent the cotton to be picked and the trigger-like switch 74 is actuated to thereby move the rotary element 65 of valve 49 in a clockwise direction to the position shown in FIG. 1 whereby fluid under pressure, such as air, is introduced through the conduit 48 into the cylinder 42 to thereby move the piston 41 toward the left, as viewed in FIG. 4. As the piston 41 moves toward the left, the actuating rod 39 moves the plate-like member 21 and the annular diaphragm 17 connected thereto toward the left whereby a partial vacuum is created within the bellows housing 16. Air is thus drawn in through the perforated partition 23 to create a partial vacuum within the cotton receiving chamber 26, thereby overcoming the pressure exerted by the tension spring 31 whereby the check valve 28 is moved in a counterclockwise direction, as viewed in FIG. 4, to thereby permit free flow of the air and cotton into the cotton receiving chamber 26. Upon release of the trigger-like switch 74, the spring 73 moves the rotary element 65 of the valve 49 in a counterclockwise direction whereby the conduit 48 is in communication with the exhaust port 66. The spring 47 then moves the piston 41 toward the right, as viewed in FIG. 4, whereby the diaphragm 17 returns to the position shown in FIG. 4. As the diaphragm 17 moves toward the right, as shown in FIG. 4, the check valve 36 is forced in a clockwise direction to the position shown in FIG. 4 whereby any cotton in the cotton receiving chamber 26 is forced therefrom into the cotton discharge passageway 33. At the time the cotton is being discharged from the cotton receiving chamber 26, the check valve 28 is in closed position, as shown in FIG. 4, due to the pressure exerted by the spring 31 and the force of the air thereagainst as the diaphragm 17 is returning to the position shown in FIG. 4.

The movement of the piston 41, the plate-like member 21 and the diaphragm 17 is substantially instantaneous whereby the cotton is moved into and discharged from the cotton receiving chamber 26 almost instantaneously. Accordingly, the apparatus will take care of the flow of cotton into and from the cotton receiving chamber 26 regardless of the frequency that the trigger-like switch 74 is actuated.

From the foregoing, it will be seen that we have devised an improved pneumatic cotton harvester which is trouble-free in operation and one in which any foreign materials collected therein are continuously removed each time the apparatus is actuated.

While we have shown our invention in but one form, it will be obvious to those skilled in the art that it is not so limited, but is susceptible of various changes and modifications without departing from the spirit thereof, and we desire, therefore, that only such limitations shall be placed thereupon as are specifically set forth in the appended claims.

What we claim is:

1. A cotton harvester comprising
    (a) a cotton pickup tube,
    (b) there being a cotton receiving chamber having one end thereof in communication with the discharge end of said cotton pickup tube,
    (c) an air pervious partition member adjacent the other end of said receiving chamber,
    (d) there being a cotton discharge passageway in communication with said receiving chamber,
    (e) a bellows unit adjacent the opposite side of said air pervious partition member from said receiving chamber in position to communicate with said receiving chamber through said air pervious partition member,
    (f) at least one flexible member for said bellows unit mounted for movement in one direction to draw air from said receiving chamber through said partition member into said bellows unit and for movement in the opposite direction to force air from said bellows unit through said partition member into said receiving chamber,
    (g) a check valve mounted between the discharge end of said pickup tube and said receiving chamber in position to limit the flow of air and cotton to movement inwardly of said receiving chamber only,
    (h) a check valve mounted between said receiving chamber and said cotton discharge passageway in position to limit the flow of air and cotton to movement outwardly of said receiving chamber only,
    (i) and quick acting means to move said flexible member intermittently in said one direction and then in said other direction to draw cotton into said receiving chamber in response to movement of said flexible member in said one direction and to force cotton out of said receiving chamber into said discharge passageway in response to movement of said flexible member in said opposite direction.

2. A cotton harvester as defined in claim 1 in which the flexible member comprises
   (a) an annular foldable member secured adjacent one edge to said bellows unit,
   (b) and a centrally disposed plate-like member secured to the other edge of said foldable member and operatively connected to said quick acting means whereby said foldable member moves in response to movement of said plate-like member.

3. A cotton harvester comprising
   (a) a cotton pickup tube,
   (b) there being a cotton receiving chamber having an inlet in communication with the discharge end of said cotton pickup tube,
   (c) there being a cotton discharge passageway in communication with said receiving chamber,
   (d) a bellows unit in communication with said receiving chamber,
   (e) an air pervious partition member between said receiving chamber and said bellows unit,
   (f) at least one flexible member for said bellows unit mounted for movement in one direction to draw air from said receiving chamber through said partition member into said bellows unit and for movement in the opposite direction to force air from said bellows unit into said receiving chamber,
   (g) a check valve between said pickup tube and said receiving chamber in position to limit the flow of air and cotton to movement inwardly of said receiving chamber only,
   (h) a check valve between said receiving chamber and said cotton discharge passageway in position to limit the flow of air and cotton to movement outwardly of said receiving chamber only,
   (i) and quick acting means to move said flexible member intermittently in said one direction and then in said other direction to draw cotton into said receiving chamber in response to movement of said flexible member in said one direction and to force cotton out of said receiving chamber into said discharge passageway in response to movement of said flexible member in said opposite direction.

4. A cotton harvester as defined in claim 2 in which the annular foldable member is generally U-shaped as viewed in transverse cross section, and the legs of said U-shaped diaphragm are secured to said housing and said plate respectively.

5. A cotton harvester as defined in claim 1 in which a check valve is mounted in a side of said bellows unit in position to discharge foreign materials and air outwardly of said bellows unit only through said check valve as the flexible member moves in a direction to force air and cotton from said cotton receiving chamber into said cotton discharge passageway.

6. A cotton harvester as defined in claim 5 in which there is a passageway through the side of said bellows unit, a valve member adjacent the outer end of said passageway disposed to move toward and away from said passageway, and means urging said valve member toward said passageway.

7. A cotton harvester as defined in claim 1 in which the means to move the flexible member comprises a centrally disposed plate member secured to said flexible member, an actuating rod attached to said plate member, fluid pressure operated means operatively connected to said rod for reciprocating said rod, and quick acting means to introduce fluid under pressure into said fluid pressure operated means whereby said rod is reciprocated.

8. A cotton harvester as defined in claim 7 in which the fluid pressure operated means operatively connected to said rod comprises a piston connected to said rod, a cylinder surrounding said piston, a wall closing one end of said cylinder, means introducing fluid under pressure into said cylinder between said piston and said wall whereby said piston and said rod are moved in a direction to draw air and cotton into said cotton receiving chamber, and means to return said piston to its original position to force cotton from said cotton receiving chamber into said cotton discharge passageway.

9. A cotton harvester as defined in claim 8 in which the means to return said piston to its original position comprises a compression spring.

References Cited in the file of this patent
UNITED STATES PATENTS
644,544    Belt _____ Feb. 27, 1900